United States Patent [19]
Heitl

[11] Patent Number: 5,876,178
[45] Date of Patent: Mar. 2, 1999

[54] HEAVY PACKAGE TRANSFER APPARATUS

[76] Inventor: Joseph W. Heitl, 2743 Bay Settlement Rd., Green Bay, Wis. 54311

[21] Appl. No.: 848,642

[22] Filed: Apr. 29, 1997

[51] Int. Cl.$^6$ .............................. B66C 23/00; B66F 9/00
[52] U.S. Cl. ........................................... 414/726; 414/607
[58] Field of Search ................... 414/607, 724, 414/796.5, 796.9

[56] References Cited

U.S. PATENT DOCUMENTS

| | | | |
|---|---|---|---|
| 2,575,552 | 11/1951 | Glenn, Jr. ................................. | 414/607 |
| 2,987,205 | 6/1961 | Draxler .................................... | 214/730 |
| 3,050,205 | 8/1962 | Coash et al. ............................ | 214/514 |
| 3,561,620 | 2/1971 | Willis ....................................... | 214/164 |
| 3,791,544 | 2/1974 | Moses ...................................... | 414/607 |
| 3,822,803 | 7/1974 | Thompson ............................... | 414/607 |
| 3,854,616 | 12/1974 | Willis et al. ............................. | 214/620 |
| 4,252,496 | 2/1981 | Williams ................................. | 414/607 |
| 5,516,255 | 5/1996 | Tygard .................................... | 414/607 |

*Primary Examiner*—David A. Bucci
*Assistant Examiner*—Douglas Hess
*Attorney, Agent, or Firm*—Russell L. Johnson

[57] ABSTRACT

A materials handling apparatus that is securable to a materials handling vehicle so as to permit an operator to position an arm carrying a pusher element over a stack of large heavy packages and to bring the pusher element to bear on the top package on the stack so as to push the package from the stack onto a carrier such as a pallet.

6 Claims, 5 Drawing Sheets

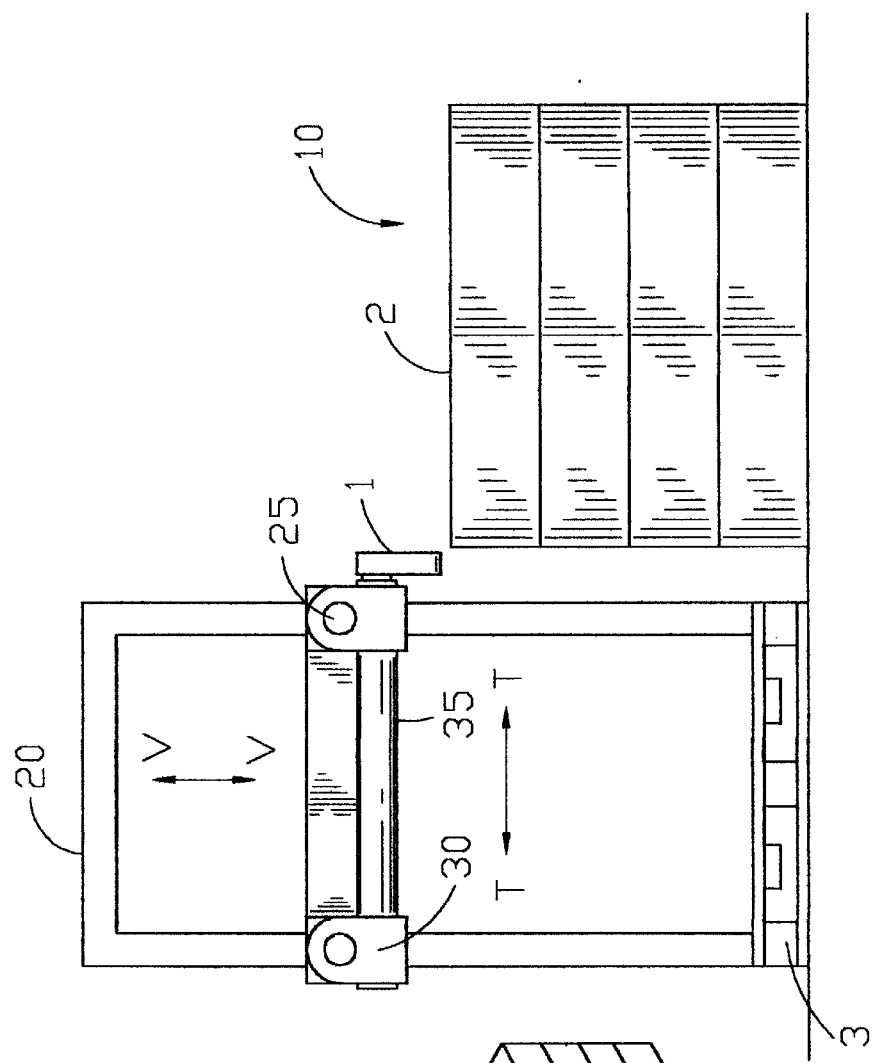
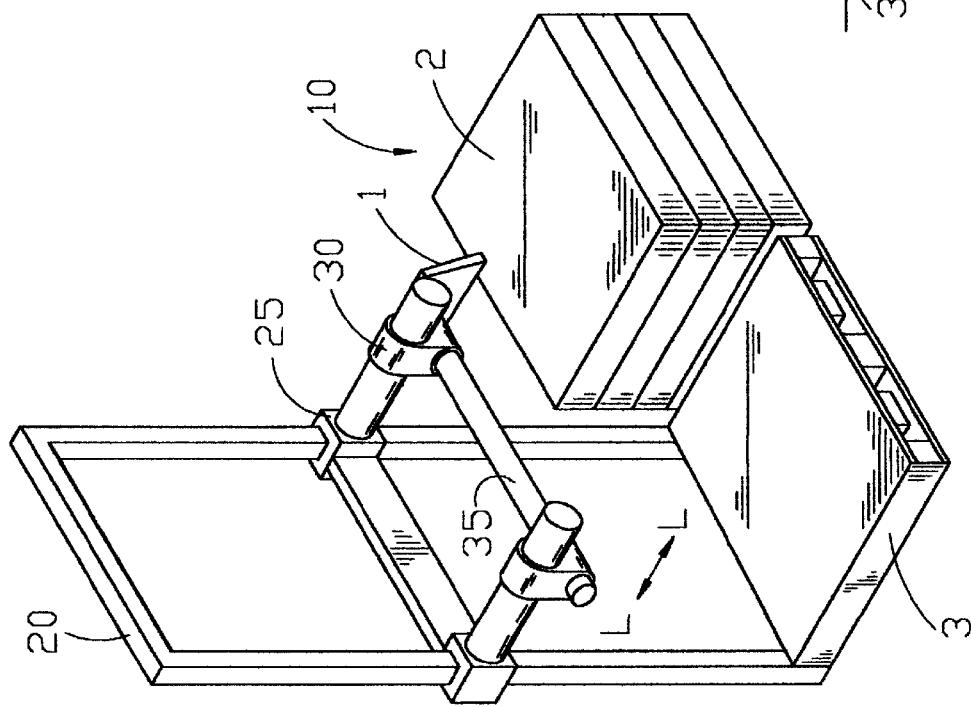

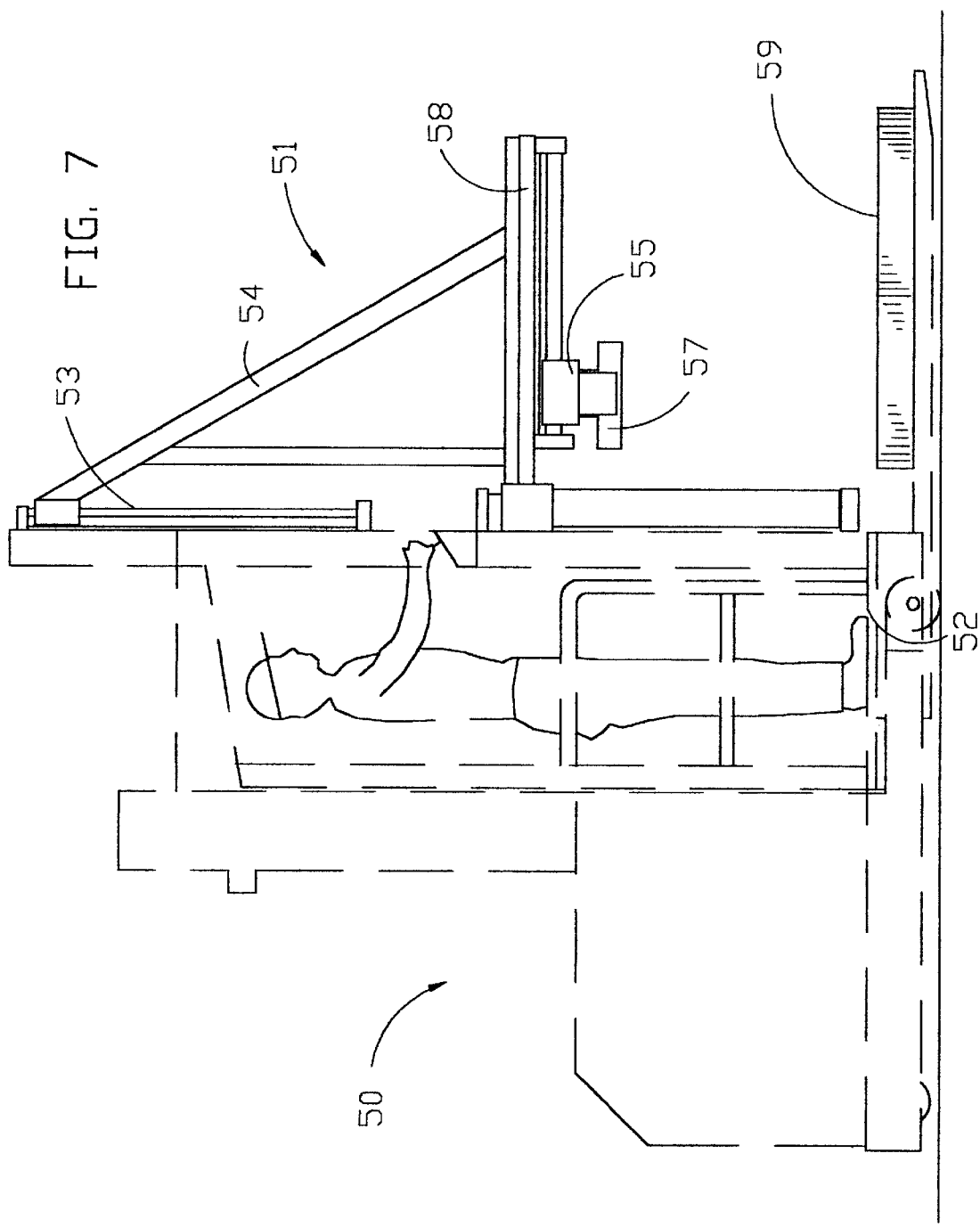

HEAVY PACKAGE TRANSFER APPARATUS

FIELD

This invention relates to apparatus for facilitating the transferring of a large heavy package from a storage pallet or pile to a transport unit.

More specifically this invention relates to the apparatus described above wherein the apparatus is attachable to a conventional materials handling vehicle for the purpose of adapting the vehicle to a configuration that will enable it to accomplish storage stack to carrier transfers of large heavy packages.

Still more specifically, this invention relates to the apparatus described above wherein the apparatus is particularly well suited to the transferring of large heavy packages containing stacks of paper sheets from a storage stack to a transport pallet.

BACKGROUND

Paper makers and/or converters provide papers in the form of large sheets that are packaged in large boxes or with heavy duty wraps. These packages are large and heavy. Typically a package of such sheets would have dimensions up to 40"×58"×6" or more, and have weights up to 200 pounds and more.

Paper makers and/or converters typically provide a number of grades and colors of papers which are put up in pallet load quantities. Users, frequently would prefer to order in package quantities. In order to serve this need, vendors will take orders for package quantities and make up mixed loads. A common practice in the art is to place at least one pallet of the grades and colors ordered at floor level and make up mixed loads by manhandling the large heavy packages from the storage pallet to a transport pallet.

It is common practice in the art to store pallets containing packages of sheet papers in stacks or racks that can be several pallet loads high.

There has been a long felt and recognized need in the art for a means for removing single packages directly from storage pallets and transferring them to a pallet carried on a transport vehicle without the need for manhandling the packages. Heretofore, the art has not provided such means. The packages are large, heavy, and difficult to engage and control and move with conventionally available materials handling equipment. The value of the papers in the packages, combined with the vulnerability of the paper to damage, have heretofore made it unfeasible to use presently available materials handling units to effect pallet-to-pallet transfers of such packages.

PRIOR ART

The prior art is replete with attachments for materials handling equipment that enables the equipment to perform specialized tasks.

U.S. Pat. No. 2,987,205 to Drexler teaches an apparatus for transferring heavy dies to and from a die press.

U.S. Pat. No. 3,050,205 to Coash teaches an attachment for a load carrying vehicle that facilitates the transfer of pallets to either side of and lateral to the direction of travel of the vehicle.

U.S. Pat. No. 3,561,620 to Willis and U.S. Pat. No. 3,854,616 to Willis teach materials handling vehicles that are provided with telescoping elements which facilitate the transfer of materials to and/or from the vehicle.

Elements of these and other prior art materials handling units can be seen to enable the operability and functionality of this invention, and their contributions to the practical application of this invention are gratefully acknowledged. However, the prior art does not provide an attachment that is securable to a materials handling vehicle that provides a laterally extendible and retractable arm that is terminated with a pushing element which is configured so that when the arm is positioned to overarch a package of the type described above and the pusher element is caused to engage the package followed by the retraction of the arm, the pusher element will cause the package to be pushed from the storage stack onto a transport pallet positioned to receive the package.

BRIEF DESCRIPTION

The invention in its simplest form comprises an extendible and retractable arm having a first end operably attached to a transport vehicle and a second end having a pusher element attached thereto such that the arm can be extended to position it over a large heavy package and the pusher element can be engaged with the heavy package so that when the arm is retracted the heavy package is pushed towards the transport vehicle by the pusher element.

BRIEF DESCRIPTION OF THE DRAWINGS

FIG. 1 is a schematic perspective view illustrating the elements essential to practicing the invention as the elements would be configured preparatory to initiating a package transfer.

FIG. 2 is a front elevational view of the configuration of FIG. 1.

FIG. 7 is a side elevational view of the apparatus of this invention in combination with a materials handling vehicle.

DETAILED DESCRIPTION

Figure 4:
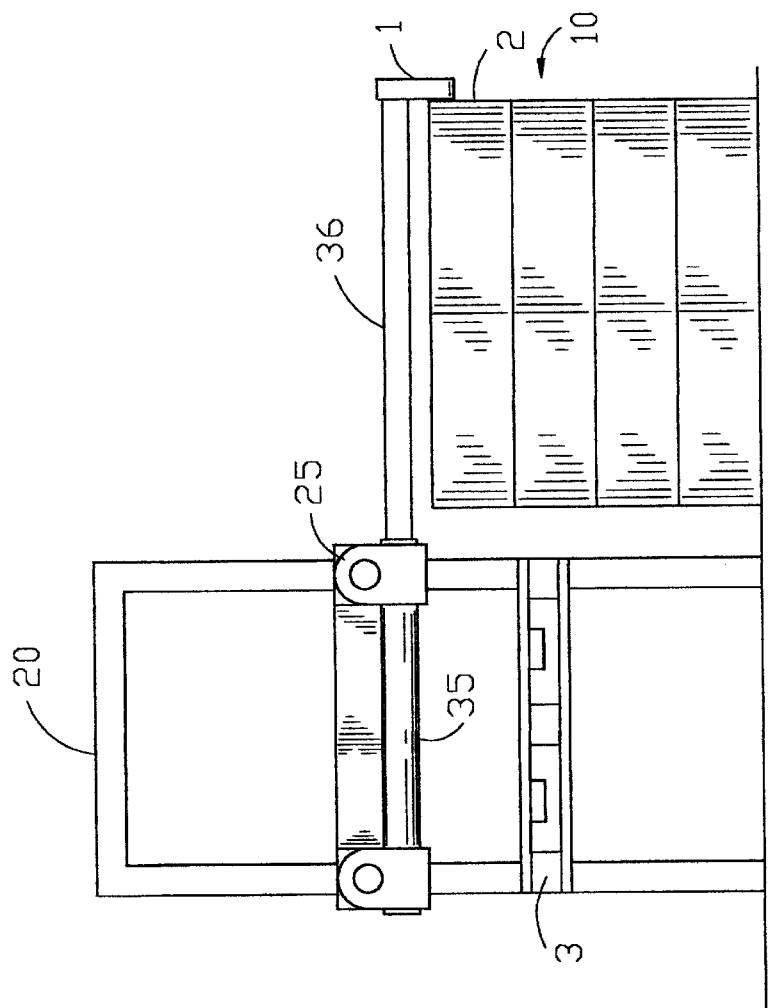
FIG. 4 is a front elevational view of the configurations of FIG. 3.

In the figures, like numbers refer to like objects, and the proportions of some elements have been modified to facilitate illustration, and elements which are not relevant to the making of a full disclosure of the invention have been omitted to simplify the illustrations.

The term "push" as used herein shall be given the dictionary meanings associated with pressing, pressure and applying a compressive force to effect a movement.

The terms, "longitudinal". "lateral", and "vertical" as used herein, shall be understood to be taken relative to a transport vehicle and its direction of travel upon a level floor.

Referring now to FIGS. 1 through 6 which are schematic representations of the critical elements of this invention. The apparatus of this invention facilitates the positioning of pusher element 1 of this invention so as to enable it to bear against a large heavy package 2 and to cause the pusher element 1 to push the package 2 from a storage position, shown here as stack 10, onto a transport carrier, shown here as pallet 3.

Large heavy packages such as those containing sheet stock are difficult to grip and/or lift. They contain valuable materials that are easily damaged by improper handling. It is common practice in the art to handle stacks of such packages on pallets and to manhandle individual packages when it becomes necessary to transfer single packages. The manhandling involves heavy lifting of a large difficult-to-grip unit which is physically demanding. Manhandling of heavy packages is also costly in terms of time and labor. Heretofore, the art has not provided materials handling apparatus that can satisfactorily perform the transfer functions involving such large packages so as to materially reduce the amount of manhandling of such packages necessary to safely achieve such transfers.

The apparatus, shown schematically in FIGS. 1–6 illustrate the functions of the apparatus of this invention in simplified form. Vertical guide frame 20 serves to guide movements of the apparatus of this invention in the vertical direction as indicated by arrows V—V in FIG. 2. Longitudinal guide assembly 25 is configured to be movable vertically on guide frame 20 and to serve to guide carriers 30 in the longitudinal direction, indicated in FIG. 1 by arrows L—L. Carriers 30 carry extendible and retractable unit 35 which carries pusher element 1 in a vertical plane, on its extendible and retractable element 36. As shown in FIGS. 1–6 extendible and retractable element 36 is positioned to extend and retract transversely to the longitudinal direction as indicated by arrows T—T in FIG. 2.

The above arrangement of mutually perpendicular axes permits the positioning of pusher element 1 at any point within the ranges of movement of the apparatus. While it is possible, for special applications, to provide other directional orientations to any of the elements of the apparatus described, the axes shown in FIGS. 1–6 represent a broadly useful configuration for the key elements of this invention.

It is also well understood in the materials handling art that, in most instances, each application of materials handling technology will entail some accommodation of specific mechanisms to meet the specific needs of the situation at hand. Therefore, the following descriptions should be seen as broadly descriptive of the invention and not be limited to the specific configurations described.

Figure 3:
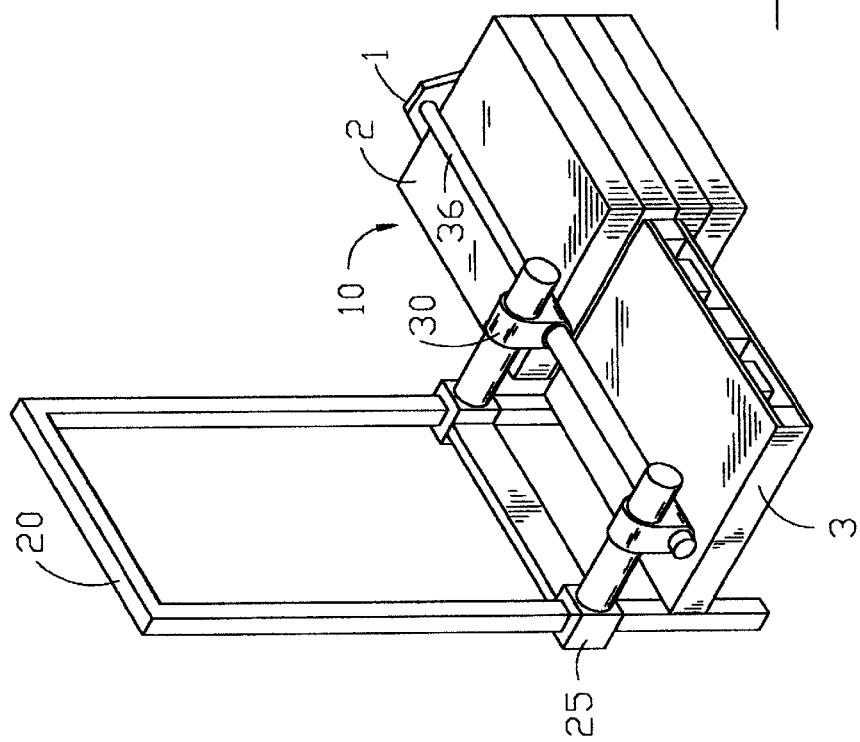
FIG. 3 is a schematic perspective view similar to that of FIG. 1 illustrating the configurations of the elements preparatory to effecting a package transfer.
Figure 6:
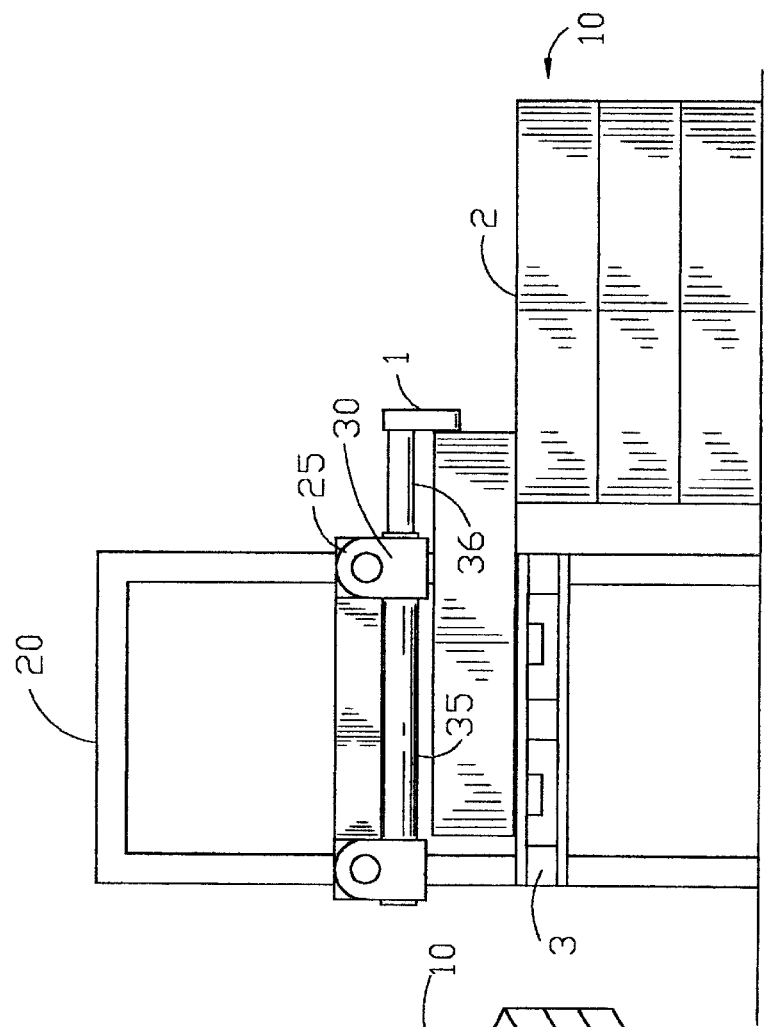
FIG. 6 is a front elevational view of the configurations of FIG. 5.
Figure 5:
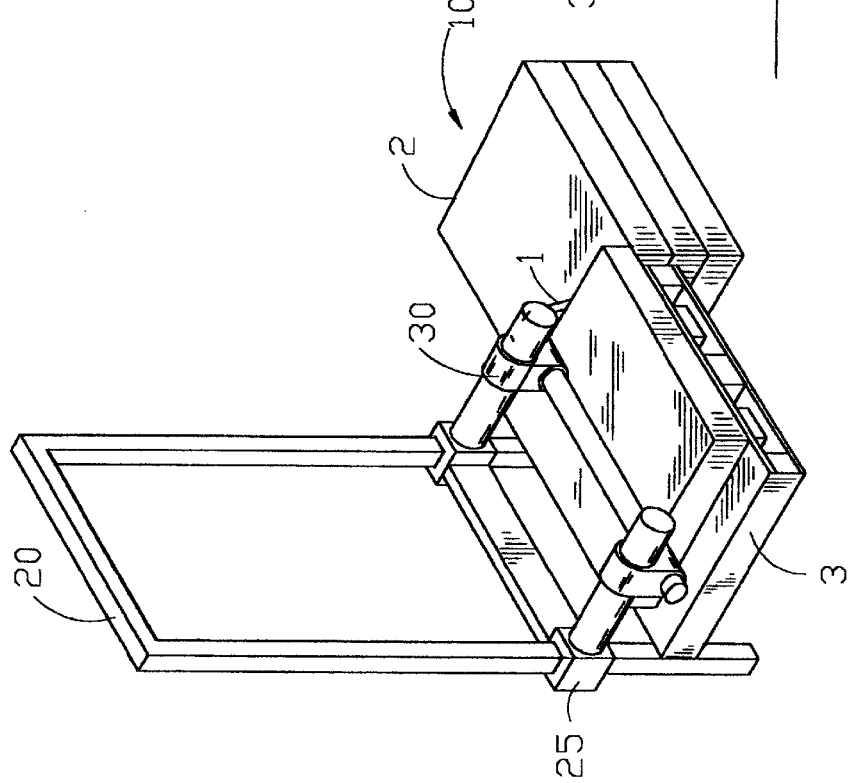
FIG. 5 is a schematic perspective view similar to that of FIGS. 1 and 3 illustrating the configurations of the elements near completion of a package transfer.

As shown in FIGS. 1 and 2, the apparatus of this invention is positioned in alignment with package 2 preparatory to effecting the transfer of package 2 from a storage location to a carrier such as pallet 3. Guide frame 20 which may be a part of or an attachment to a materials handling vehicle, not shown, is positioned adjacent to and aligned with the package to be transferred. Longitudinal guide assembly 25 is raised on guide frame 20 to a position above package 2, and pallet 3 is raised on guide frame 20 to a position just below package 2 as shown in FIGS. 3 and 4. Carriers 30 are positioned along longitudinal guides 26 so as to position extendible and retractable unit 35 adjacent to the middle of package 2. Extendible and retractable element 36 is then extended over package 2 and the apparatus is adjusted to bring pusher 1 into contact with package 2 as shown in FIGS. 3 and 4. Element 36 is then retracted so as to cause pusher 1 to push package 2 from stack 10 onto pallet 3 as shown in FIGS. 5 and 6.

From the above disclosures, it can be seen that the weight of package 2 is supported, by stack 10 and pallet 3 during the act of transferring package 2 from stack 10 to pallet 3. The forces applied to package 2 are compressive forces such as those developed by the act of pushing package 2 with pusher 1 as opposed to the forces that would be developed if package 2 were pulled by pusher 1. The material in package 2, and by extension package 2 itself, is not readily compressible or damaged by distributed compressive loads. By supporting the weight of package 2 during the transfer, and pushing package 2 from the storage stack to the carrier, the inventor has provided a means for facilitating the transfer of a large heavy package from a storage stack to a carrier without subjecting the package to the damaging forces present in manhandling the package and has eliminated the physical labor associated with the transfer as well as reduced labor and equipment time required to make the transfer.

The invention admits of many variants. While the complete disclosure of all the combinations and variants of the elements of the invention can not be presented without greatly multiplying the drawings and making the specifications prolix, the following disclosures of preferred embodiments will contribute to further understandings of the nature of the invention.

The invention can be practiced using movers and motive elements that are electrical, hydraulic, pneumatic, mechanical and combinations thereof.

The best mode of practicing the invention known to the inventor at the time of the preparation of this disclosure, is to use a combination of hydraulic cylinders and mechanical structures with electrical utilities and controls. The materials handling vehicle best suited to carry the apparatus of this invention is a standing operator fork lift.

Figure 8:
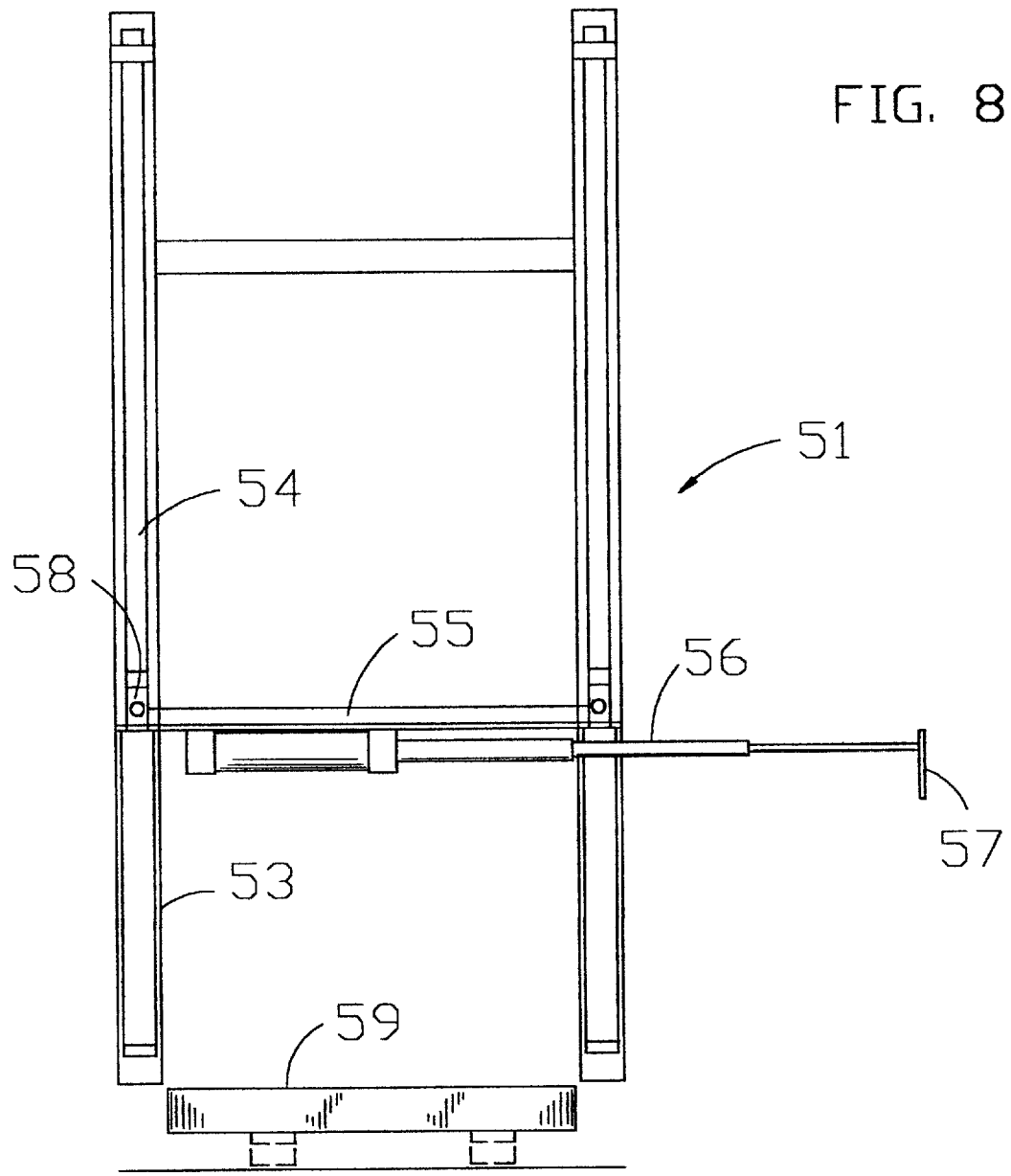
FIG. 8 is a front elevational view of the apparatus of FIG. 7.

Referring now to FIGS. 7 and 8 wherein a preferred mode of practicing this invention is illustrated. It should be understood that individual embodiments may be given different configurations in response to the size and weight of the packages being transferred, the configurations of the storage facilities and the storage stacks, and the design of the materials handling equipment to which the apparatus of this invention is to be attached and/or with which it is to interact.

Materials handling vehicle 50, shown dashed, is here shown as a standing operator fork lift. The operator platform 52 is raised and lowered with the forks of a standing operator fork lift. This places the operator near the transfer when it is made and gives him a good view of the transfer.

Transfer apparatus 51 is secured to the operator platform 52 and utilities such as electrical and hydraulic lines are provided by vehicle 51. Controls for operating transfer apparatus 51 are located on platform 52.

Apparatus 51 comprises; a vertical frame 53, a positioning frame 54, a pusher arm carriage 55, a extendible and retractable pusher arm 56, and a pusher 57 secured to pusher arm 56.

Vertical frame 53 is securable to operator platform 52 of vehicle 50 and defines guides along which positioning frame 54 may be moved vertically as shown by arrows V—V. Positioning frame 54 is provided with longitudinal guides 58 along which pusher carriage 55 may be moved longitudinally as shown by arrows L—L. Pusher carriage 55 has as a part thereof extendible and retractable pusher arm 56 which can be extended and retracted transversely to the direction of travel of vehicle 50 as shown by arrows T—T.

In use, vehicle 50 is positioned with a carrier 59 along side of a storage stack of large heavy packages. operator platform 52 is raised until carrier 59 is positioned at or slightly below the level of the bottom of a package to be transferred to carrier 59. Positioning frame 54 is moved vertically until it positions pusher arm 56 at a location slightly above the package to be transferred. Pusher carriage 55 is moved longitudinally on positioning frame 54 until pusher arm 56 is positioned at the approximate center of the package to be transferred. Pusher arm 56 i s then extended transversely until arm 56 overarches the package to be transferred and pusher 57 is positioned on the side of the package opposite the side where carrier 59 is positioned. The location of pusher 57 is then adjusted along the three orthogonal axes of apparatus 51 until pusher 57 bears against the package to be transferred. Pusher arm 57 is then retracted, thereby pushing the package to be moved for the storage stack onto the carrier.

The apparatus of this invention involves novel combinations of old elements to achieve an end that has heretofore been achieved by manhandling. To set forth the known functional equivalents of the elements of this invention would greatly multiply the drawings and cause the specifications to become prolix. Therefore it should be understood that the scope of this invention should not be limited to the embodiments disclosed, but rather the scone should be limited only by the scope of the appended claims and all equivalents thereto that would be made obvious to one skilled in the art.

What is claimed is:

1. Large package transferring apparatus comprising;
   a) a vertical guide frame which is securable to a materials handling vehicle,
   b) a longitudinal guide assembly that is vertically movable on said guide frame,
   c) carriers which are longitudinally movable on said longitudinal guide assembly and said carriers have secured thereto an extendible and retractable unit having as a part thereof an extendible and retractable element which is transversely extendible and retractable to the longitudinal movement of the carriers,
   d) a pusher which is positionable in a vertical plane to said extendible and retractable element and said pusher is shaped so as to enable the engagement of the pusher with a package to, be pushed from a storage location towards said carriers.

2. The apparatus of claim 1 wherein said materials handling vehicle is a lift truck.

3. The apparatus of claim 2 wherein said materials handling vehicle is a standing operator fork lift.

4. Apparatus for transferring large heavy packages from a storage stack to a pallet, comprising;
   a) a means for positioning a pallet adjacent to said storage stack and below the bottom of a heavy package,
   b) carriers which are positionable above said pallet and above the height of the top of said heavy package,
   c) an extendible and retractable unit secured to said carriers and having as a part thereof an extendible and retractable element which is transversely extendible and retractable to said camers, and said extendible and retractable element is extendible so as to overarch said heavy package and said extendible and retractable element has a carrier end and a pusher end,
   d) a pusher positionalble in a vertical plane to said pusher end of said extendible and retractable element, and said pusher is configured so as to engage said heavy package at a location across the package from said carriers, and
   e) said extendable and retractable element is retractable so as to cause said pusher element to push said heavy package from said storage stack onto said pallet.

5. The apparatus of claim 4 in combination with a materials handling lift truck.

6. The apparatus of claim 5 wherein said lift truck is a standing operator fork lift.

* * * * *